United States Patent [19]

Moreux et al.

[11] Patent Number: 5,046,172
[45] Date of Patent: Sep. 3, 1991

[54] REMOVABLE SUPPORT PLATE AND ELECTRIC APPARATUS FOR A POWER DISTRIBUTOR DEVICE

[75] Inventors: Alain Moreux; Daniel Nourry, both of Dijon; Jean-Pierre Thierry, Couternon, all of France

[73] Assignee: Telemecanique, France

[21] Appl. No.: 548,713

[22] Filed: Jul. 6, 1990

[30] Foreign Application Priority Data

Jul. 6, 1990 [FR] France ............................... 89 09095

[51] Int. Cl.[5] .............................................. H02B 5/00
[52] U.S. Cl. ..................................... 361/332; 361/391; 361/393; 361/413; 361/417; 361/429
[58] Field of Search ........ 361/331, 332, 391, 393-396, 361/399, 413, 415, 417, 419-420, 429

[56] References Cited

U.S. PATENT DOCUMENTS 4,477,862 10/1984 Gonzales ............................ 361/393
4,510,552 4/1985 Kanno et al. ...................... 361/394
4,672,511 6/1987 Meusel et al. ...................... 361/415
4,738,632 4/1988 Schmidt et al. .................... 361/393

Primary Examiner—Gregory D. Thompson
Attorney, Agent, or Firm—William A. Drucker

[57] ABSTRACT

A power distribution device is disclosed for electric apparatus, comprising a set of power bars housed inside an insulating case mounted fixedly in the central cavity of a profiled rail and a removable support element having a flat bottom bordered by two parallel lateral flanges provided with a hooking device for removably fixing the support element on the rail. The bottom of the support plate carries the electric apparatus, as well as a connector pluggable on the set of bars and having guide cheeks permitting plugging/unplugging by a translational movement remaining substantially perpendicular to the plane of the set of bars.

6 Claims, 3 Drawing Sheets

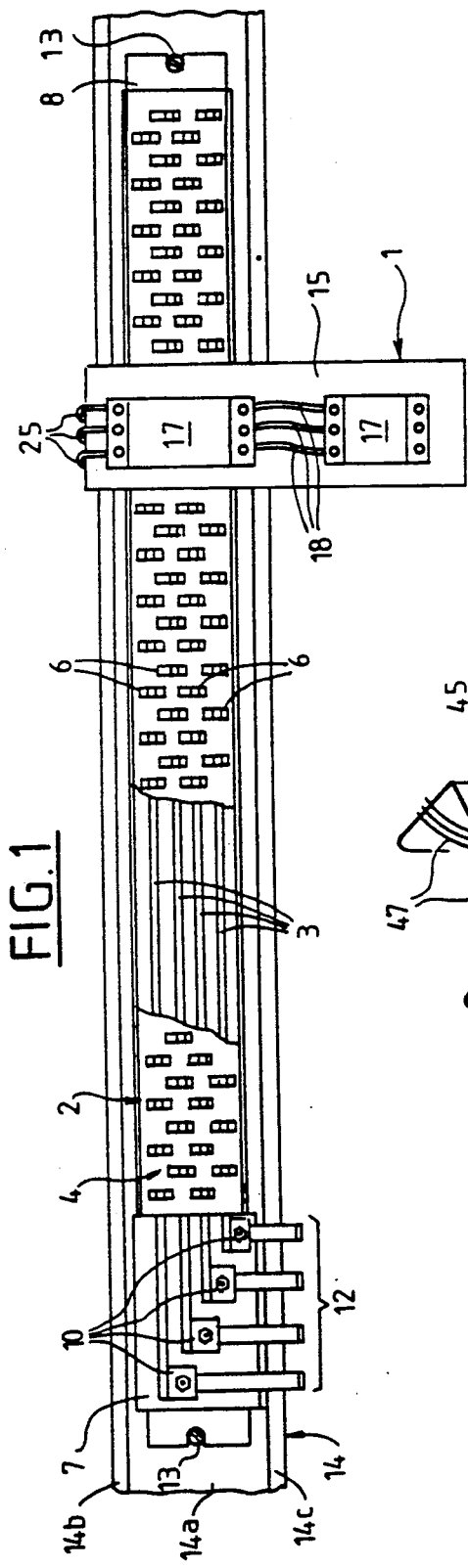
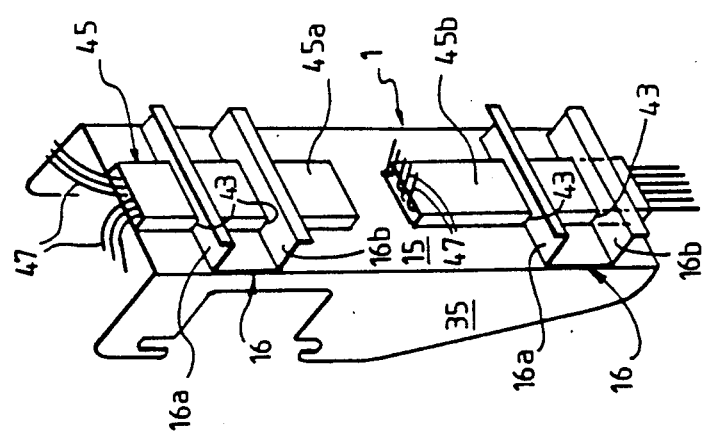

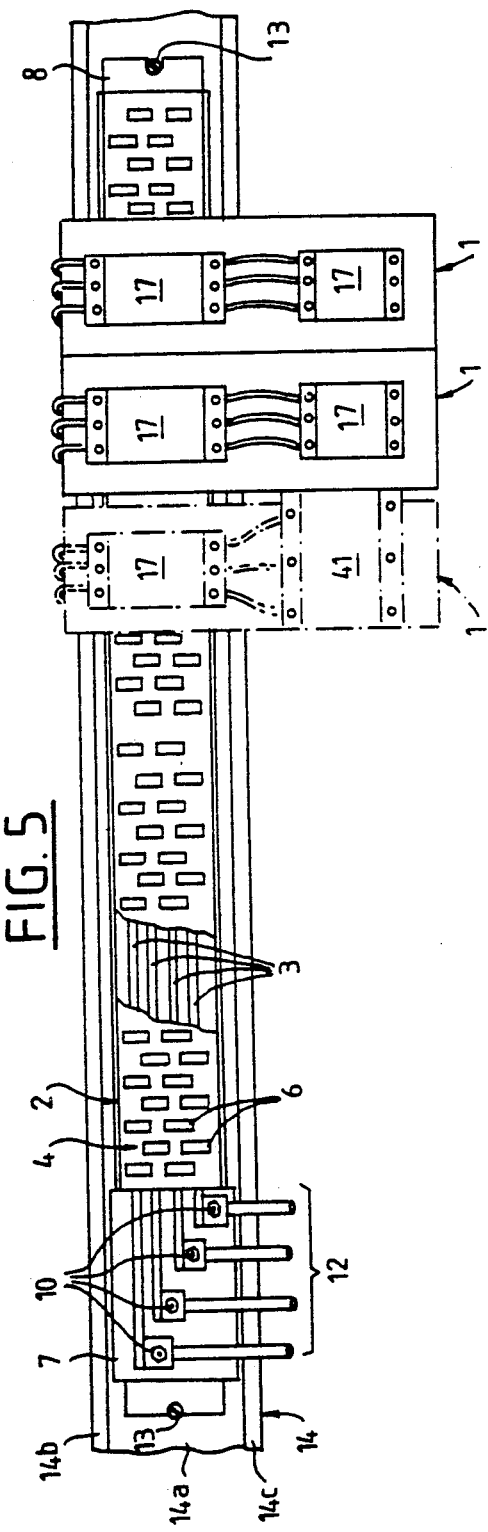
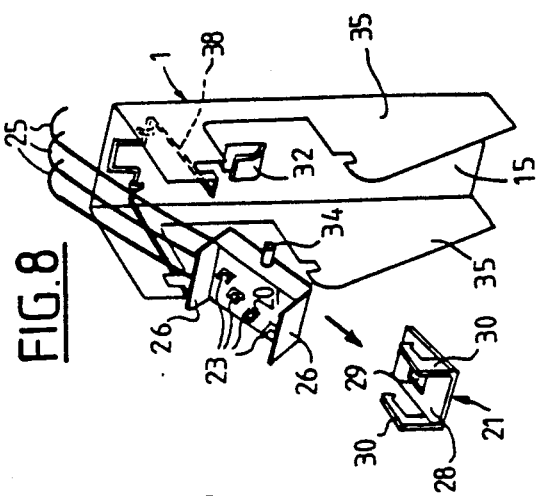
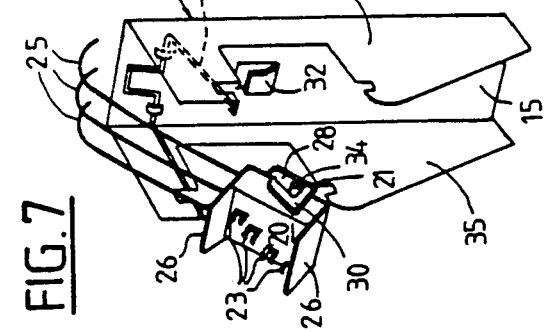
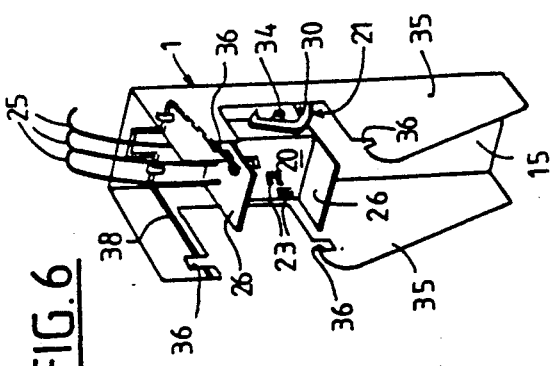

REMOVABLE SUPPORT PLATE AND ELECTRIC APPARATUS FOR A POWER DISTRIBUTOR DEVICE

BACKGROUND OF THE INVENTION

The present invention relates to a removable support plate for electric apparatus which can be associated with a power distributor device for low voltage electric installations, this device being of the type comprising a set of horizontal power bars and an insulating elongate case housing the set of bars mounted fixedly in the central space of a profiled rail and having, towards the front, namely towards the installer or user, a plurality of orifices situated opposite the bars and serving for connecting a connector, carrying removable contact members pluggable to the bars and connected by electric conductors to the respective terminals of the electric apparatus proper to the installation.

For such a distributor device, it is desirable to have a removable support plate for electric control and/or protection apparatus proper to the installation, which plate generally comprises a flat vertical bottom carrying the apparatus on its so-called rear face, namely its face directed towards the installer or user, and which is simple and quick to fit on the profiled rail or remove, not requiring the use of any special tools, while efficiently providing connection/disconnection of the connector with respect to the set of bars.

The purpose of the invention is to attain these objective.

SUMMARY OF THE INVENTION

According to the invention, for a power distributor device such as defined above, the removable plate for supporting at least one electric apparatus, of the type having a flat vertical bottom with the electric apparatus on its so-called rear face, is characterized in that the bottom of the plate is bordered over the whole of its height by two parallel lateral flanges each having means for clipping on the two flanges of the profiled rail and in that, on its so-called front face opposite its rear face, the bottom of the plate carries the connector which has guide cheeks for plugging its contact members in or out by a translational movement remaining substantially perpendicular to the plane of the set of bars.

According to another feature of the invention, the inner section of the plate formed by its bottom and its two lateral flanges is provided with a compression spring in the form of a U shaped wire whose two ends bear on the edge of one of the two flanges of the profiled rail for holding the plate in the clipped position.

According to another aspect of the invention, the connector is removably mounted on the front face of the bottom of the plate by means of a removable piece formed of a small plate which has mounted laterally thereon two claws under which bear respectively two axially aligned shafts, situated on each side of the connector, and which is formed with an opening in which is engaged a retainer hook projecting from the front face of the bottom of the plate.

This disengagement or dissociation of the connector by removing said piece is particularly advantageous so as to be able to have, as close as possible to a first plate already mounted with its associated connector on the rail carrying the distributing device, a second plate carrying an electric apparatus whose dimensions are such that it projects laterally from the plate; by first of all connecting the connector, once disengaged from the second plate, in the orifices of the distributor situated at the first accessible pitch with respect to the first plate in position, then by arranging the second plate on the carrier rail at the level of its connected connector, it is thus possible to lose the minimum of space between these plates and so use the branching capacities of the distributor device to the best advantage.

BRIEF DESCRIPTION OF THE DRAWINGS

Other features and advantages of the invention will be clear from the detailed description which follows, with reference to the accompanying drawings given solely by way of example and in which:

FIG. 1 shows in elevation, with parts cut away, a power distributor device associated with a support plate for electric apparatus in accordance with the invention;

FIG. 5 shows in elevation, with parts cut away, a power distributor device associated with several plates one of which carries a laterally projecting electric apparatus;

FIGS. 6, 7 and 8 show schematically in perspective respectively three successive steps for separating the connector from the plate by removing the part with claws; and FIG. 9 shows in perspective the plate equipped with a channel passing through the shaped pieces serving as supports for the electric apparatus.

DESCRIPTION OF THE PREFERRED EMBODIMENTS

Figure 4:
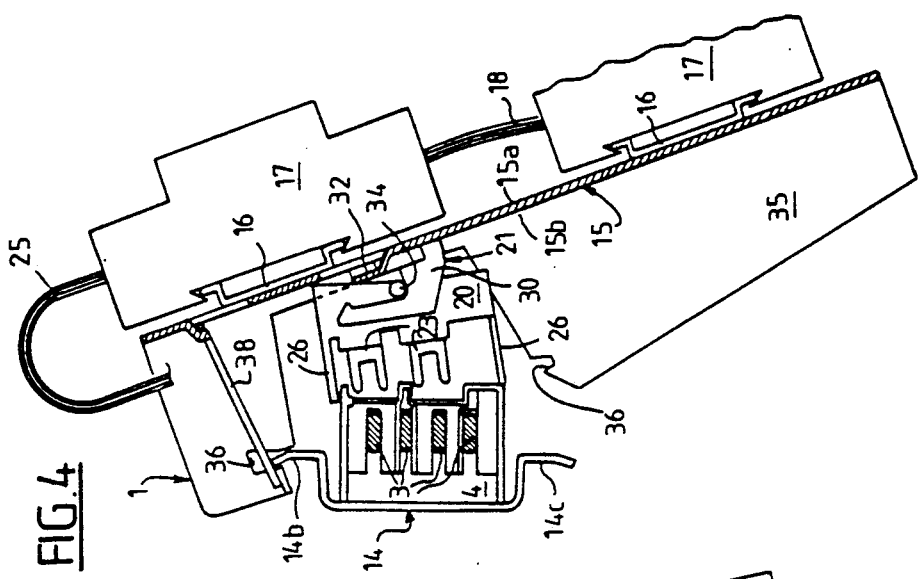
FIGS. 2, 3 and 4 show in section respectively three successive steps for removing the plate with disconnection of the associated connector.

In FIG. 1 the general reference 1 designates a removable motor-start plate for supporting modular electric apparatus, which is associated with a power distributor device 2 for a low voltage electric installation.

The distributor device 2 comprises a set of power conducting bars 3, disposed horizontally and flat, for example four in number corresponding to a three phase line with neutral, as well as an elongate insulating case 4 housing the set of bars 3.

The insulating case 4 has, towards the front, a plurality of orifices 6 situated opposite bars 3 and, preferably, in a staggered arrangement with predetermined pitch, the orifices may also be aligned.

Case 4 further comprises an upstream connection box 7 and a closure end-piece 8; box 7 houses means 10 for connecting the set of bars 3 to upstream conductors 12. Appropriate dividing walls provide in case 4, from box 7 as far as end-piece 8, insulation between the conducting bars 3.

The insulating case 4, FIG. 1, is further mounted fixedly by means of a screw-nut assembly 13, at each of its ends, in the central space 14a of a carrier rail formed by a top-hat rail 14, between flanges 14b, 14c thereof. The top-hat rail 14 may form part of a frame of an electric distributing case such as a cupboard or cabinet.

Figure 3:
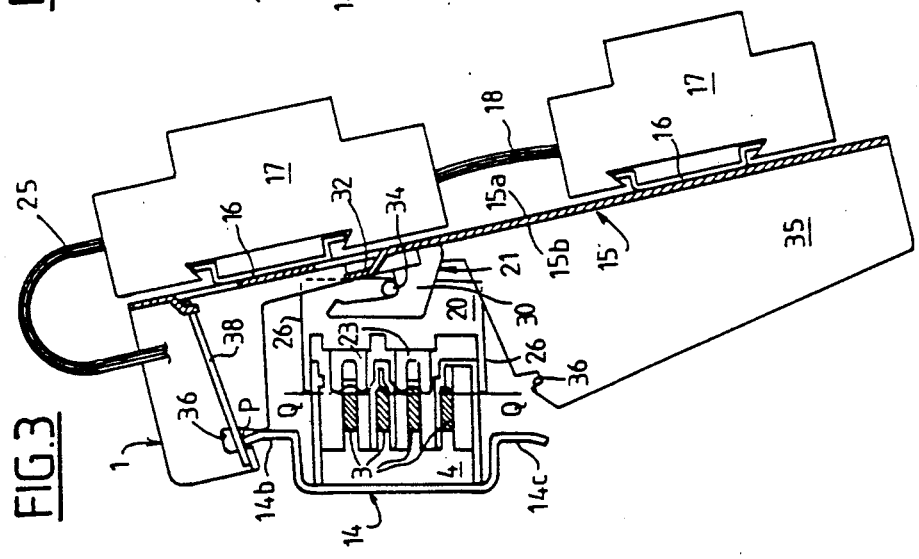
Figure 2:
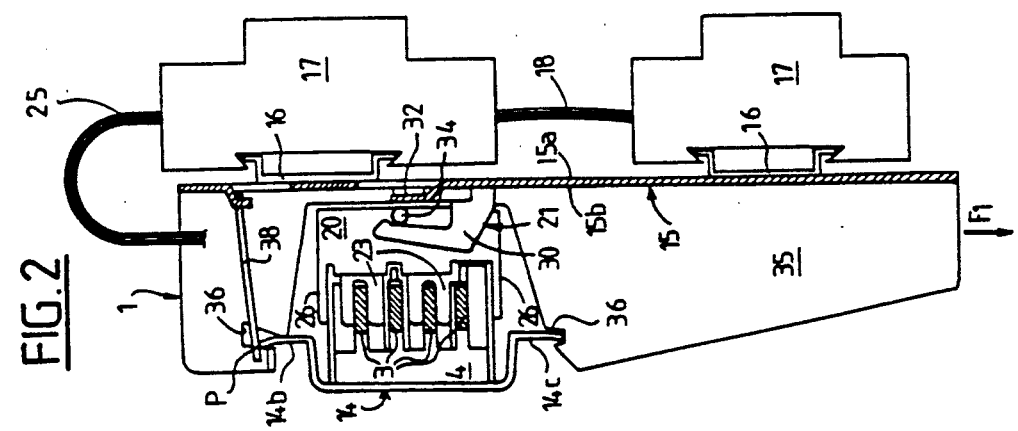

As can be seen in FIGS. 2 to 4, the removable plate 1 for supporting modular electric control and/or protection apparatus such as circuit breakers, circuit makers or similar, is formed of a flat vertical bottom 15 whose rear face 15a is provided with top-hat rails 16, two in number in the example chosen, to which apparatus 17 are clipped, connected together by electric power conductors 18, and whose front face 15b carries a removable electric connector 20 via a connecting piece 21 which is removable as will be explained below. It should be noted that the two top-hat rails 16 are each adjustable between axes; furthermore, the plate may be provided for carrying only a single electric apparatus by means of a top-hat rail also adjustable between axes, without departing from the scope of the invention.

Connector 20 is in the form of a parallelepipedic block from which contact clips 23 project forwards which are pluggable on bars 3 by introduction in the orifices of the case 4 of the distributor device (FIG. 2) and which are connected electrically by power conductors 25 to the respective terminals of the first apparatus 17.

Connector 20 also comprises two parallel cheeks 26 intended to bear respectively on the upper and lower faces of piece 4 of the distributor to serve as guide for the connector during plugging in of its contact clips 23.

The connecting piece 21, best seen in the dismantled condition in FIG. 8, is formed by a small plate 28 with a central opening 29 and at the top of which two parallel claws 30 are mounted laterally. The connecting piece 21 is fitted to the bottom 15 of the plate by introducing into opening 29 a retainer hook 43 projecting from the front face 15b of the bottom 15 of the plate. Preferably, hook 32 is formed by a cut-out in bottom 15 of the plate. Connector 20 is fixed to the connecting piece 21 by means of two shafts 34, only one of which is visible in FIGS. 2 to 4, which are aligned axially and situated on each side of the connector and which bear respectively under the claws 30 of piece 21.

As shown in FIG. 6, the bottom 15 of the plate is bordered over the whole of its height by two parallel lateral flanges 35 each having notches 36 for clipping cooperation respectively with the two flanges 14b, 14c of the top-hat rail 14 during fitting of plate 1 on this rail 14, see FIG. 2.

It should be noted that bottom 15 and the two lateral flanges 35 of plate 1 may be made from metal or from a plastic material.

On the inner section of plate 1 a compression spring 38 is provided in the form of a U shaped wire (FIG. 6) whose two ends are situated at the level of the respective upper notches 36 of the two flanges 35 so as to bear on the edge of flange 14b of rail 14 for holding plate 1 in the clipped position (FIG. 2). In the case of a metal plate, spring 38 provides ground continuity with rail 14, which plays the role of protective conductor.

FIGS. 2 to 4 show removal of plate 1 by unclipping as well as disconnection of the associated connector 20 by pulling out its contact clips 23. From the position of the plate clipped on the top-hat rail 14 and the plugged-in position of the clips of the associated connector on the set of bars 3, FIG. 2, a pull exerted manually downwards in the direction of arrow F1 of the flanges 35 of the plate, against spring 38, causes the plate to move down and disengages flange 14c of rail 14 from the respective lower notches 36 of the two flanges 35 of the plate; during this pull, after disengagement of flange 14c of rail 14, an anti-clockwise rotation of the plate about the point P of application of spring 38 against the flange 14b of rail 14, causes, by each shaft 34 of the connector bearing against the free end of the corresponding claw 30 of the connecting piece 21, unplugging of the contact clips 23 following a translational movement substantially perpendicular to the plane Q—Q of the set of bars 3, as illustrated in FIG. 3.

At this stage, stopping the pull exerted on the plate causes the latter to rise by action of the return spring 38, the bottom of the claws 30 of the connecting piece 21 coming into contact with shafts 34 of connector 20 (FIG. 3).

Continuation of the anti-clockwise rotation of plate 2 about point P, FIG. 3, causes total disconnection of connector 20 following the above mentioned translational movement, as illustrated in FIG. 4; removal of plate 1, FIG. 4, is achieved by disengaging the flange 14b of rail 14 from the respective upper notches 36 of the two flanges 35 of the plate.

Plate 1 is fitted to top-hat rail 14, jointly with connection of the associated connector 20, substantially in a reverse manner to that described above, it being understood that in both cases—fitting and removal of the plate—the guide cheeks 26 of connector 20 ensure plugging/unplugging of the contact clips 23 by a translational movement which remains substantially perpendicular to the plane of the set of bars 3.

In FIG. 5, two plates 1 have been shown at the right which are disposed side by side in association with the distributor device and which each carry apparatus 17 inscribed perfectly within the width of the corresponding plate.

Nevertheless, it may happen that a plate to be mounted is to support an apparatus whose dimensions are such that, once fixed, it projects slightly from a side of the plate, as is the case of the apparatus designated at 41 for plate 1 illustrated with chain dotted lines in FIG. 5. In this case, to dispose this plate as close as possible to the set of the other two adjacent plates 1, connector 20 is separated from the plate in question by removing the connecting piece 21.

FIGS. 6 to 8 show the dissociation of connector 20 by removal of piece 21. From the position shown in FIG. 6, disengagement of the small plate 28 from its retainer hook 32 using a tool causes extraction of the connector 20/piece 21 assembly (FIG. 7). Once the connector 20 is separated, piece 21 becomes useless and it is readily removed by disengaging the two shafts 34 from under the corresponding claws 30 (FIG. 8).

With piece 21 withdrawn, the contact clips of the separated connector 20 are plugged on the bars 3 (FIG. 5) by insertion in the orifices 6 situated at the first accessible pitch, for example on the left of the assembly of the two plates already in position. The plate 1 supporting the two apparatus 17 and 41 is then clipped on the flanges 14b, 14c of the top-hat rail 14, occupying the position shown by a chain dotted line in FIG. 5, so that it is off-centered with respect to the connector so as to come as close as possible to the adjacent plate. Thus, in some cases, with separation of the connector from the plate, the branching capacities of the distributor device are used to the best possible advantage.

As shown in FIG. 9, the two top-hat rails 16 each have on their two respective flanges 16a, 16b coaxial perforations 43 for passing an insulating tube 45, for example having a rectangular cross section, made here in two parts 45a, 45b, extending transversely to the longitudinal direction of rail 16. This tube 45 serves as channel in which are housed electric control conductors 47 proper to the electric apparatus (not shown) clipped on these same rails 16. Thus, advantageously, the tube 45 hides the wiring (control conductors) and so improves the aesthetic appearance of the plate.

What is claimed is:

1. Power distributor device which comprises:

(i) a set of horizontal bars;
(ii) an insulating elongate case housing said bars and provided with a plurality of orifices located opposite said bars;
(iii) a profiled rail comprising a web and first and second lateral flanges, said web and said flanges delimiting a central space wherein said elongate case is fixedly engaged;
(iv) a removable support element having two vertical parallel flanges connected by a flat vertical bottom, said bottom having a front face and a rear face bearing at least an electrical apparatus and said parallel flanges being provided with first and second notches for removable engagement of said first and second flanges of said profiled rail by engaging said first notches on said first flange and by effecting thereafter a transversal rocking motion of said support element so as to engage said second notcher and said second flange;
(v) a removable electrical connector mounted with a clearance on said front face of the said bottom, said connector comprising:
  removable contact members pluggable on said bars through said orifices of said case and electrically connected to said apparatus;
  means for guiding said contact members in a direction perpendicular to said bars so as to allow plugging and unplugging of said contact members on said bars, during the rocking motion.

2. Power distributor device as claimed in claim 1, wherein said bottom and said parallel flanges of said support element delimit an inner volume lodging a compression spring in the form of a U-shaped wire whose two ends bear on said first lateral flange of said profiled rail for holding said support element in an engaged position.

3. Power distributor device as claimed in claim 1, wherein said rear face of said bottom is provided with a top-hat rail to which said electric apparatus is clipped.

4. Power distributor device as claimed in claim 3, wherein said top-hat rail comprises two flanges respectively provided with a coaxial perforation through which passes an insulating tube serving as channel for electric control conductors.

5. Power distributor device which comprises:
(i) a set of horizontal power bars;
(ii) an insulating elongate case housing said set of bars and provided with a plurality of orifices located opposite said bars;
(iii) a profiled rail comprising two lateral flanges and a web, which delimit a central space wherein said elongate case is fixedly engaged;
(iv) a removable support plate having two vertical parallel flanges connected by a flat vertical bottom, said bottom comprising a front face provided with a retainer hook and a rear face which supports at least an electrical apparatus, said vertical flanges being provided with notches for engagement of said lateral flanges of said profiled rail;
(v) a removable connecting piece formed of a small plate which has, mounted laterally thereon, two claws and which is provided with an opening in which is engaged said retainer hook;
(vi) two lateral shafts, axially aligned and respectively engaged under said claws;
  removable contact member pluggable on said bars through said orifices of said case and electrically connected to said apparatus.

6. Power distributor device as claimed in claim 5, wherein said retainer hook which projects from said front face of said bottom, is formed by a folded portion of said bottom.

* * * * *

UNITED STATES PATENT AND TRADEMARK OFFICE
CERTIFICATE OF CORRECTION

PATENT NO. : 5,046,172

DATED : September 3, 1991

INVENTOR(S) : Alain Moreux et al.

It is certified that error appears in the above-identified patent and that said Letters Patent is hereby corrected as shown below:

On title page, item
(30)    Foreign Application Priority Data

Jul.6,1989   (FR)   France ............... 89 09095

Signed and Sealed this

Ninth Day of March, 1993

Attest:

STEPHEN G. KUNIN

Attesting Officer     Acting Commissioner of Patents and Trademarks